(12) United States Patent
Takamatsu et al.

(10) Patent No.: US 12,341,204 B2
(45) Date of Patent: Jun. 24, 2025

(54) RECTANGULAR SECONDARY BATTERY

(71) Applicant: Panasonic Corporation, Osaka (JP)

(72) Inventors: Hiroshi Takamatsu, Hyogo (JP); Hiroaki Imanishi, Hyogo (JP)

(73) Assignee: PANASONIC CORPORATION, Osaka (JP)

( * ) Notice: Subject to any disclaimer, the term of this patent is extended or adjusted under 35 U.S.C. 154(b) by 502 days.

(21) Appl. No.: 17/625,991

(22) PCT Filed: Apr. 27, 2020

(86) PCT No.: PCT/JP2020/017977
§ 371 (c)(1),
(2) Date: Jan. 10, 2022

(87) PCT Pub. No.: WO2021/014704
PCT Pub. Date: Jan. 28, 2021

(65) Prior Publication Data
US 2022/0278402 A1 Sep. 1, 2022

(30) Foreign Application Priority Data
Jul. 22, 2019 (JP) .................. 2019-134853

(51) Int. Cl.
*H01M 50/188* (2021.01)
*H01M 4/70* (2006.01)
(Continued)

(52) U.S. Cl.
CPC ........... *H01M 50/188* (2021.01); *H01M 4/70* (2013.01); *H01M 50/184* (2021.01); *H01M 50/191* (2021.01); *H01M 50/503* (2021.01)

(58) Field of Classification Search
CPC . H01M 50/188; H01M 50/184; H01M 50/191
See application file for complete search history.

(56) References Cited

U.S. PATENT DOCUMENTS

| | | | | |
|---|---|---|---|---|
| 2011/0104559 A1* | 5/2011 | Kim | ............... | H01M 50/567 429/163 |
| 2013/0029188 A1* | 1/2013 | Kim | ............... | H01M 50/417 429/163 |

(Continued)

FOREIGN PATENT DOCUMENTS

| | | | | |
|---|---|---|---|---|
| DE | 102014201078 A1 * | 7/2015 | .......... | H01M 2/0217 |
| JP | 2002-231297 A | 1/2001 | | |

(Continued)

OTHER PUBLICATIONS

Machine Translation of JP2016129144A (Jun. 10, 2024) (Year: 2024).*

(Continued)

*Primary Examiner* — Matthew J Merkling
(74) *Attorney, Agent, or Firm* — Rimon P.C.

(57) ABSTRACT

A rectangular secondary battery includes: an electrode body including a positive electrode plate and a negative electrode plate; a rectangular battery case having an opening and housing the electrode body; a sealing plate sealing the opening; a current collector connected to an edge of the positive electrode plate or the negative electrode plate at a longitudinal end of the sealing plate; and an external terminal located outside the sealing plate and connected to the current collector. The electrode body and the current collector is wrapped in an insulating holder and housed in the battery case. The current collector is in contact with a bottom of the battery case with the insulating holder interposed therebetween.

8 Claims, 9 Drawing Sheets

(51) Int. Cl.
  *H01M 50/184* (2021.01)
  *H01M 50/191* (2021.01)
  *H01M 50/503* (2021.01)

(56) References Cited

U.S. PATENT DOCUMENTS

| | | | | |
|---|---|---|---|---|
| 2013/0136977 | A1* | 5/2013 | Masuda | H01M 50/567 429/178 |
| 2015/0214568 | A1* | 7/2015 | Murakami | B23K 20/106 228/110.1 |
| 2015/0280274 | A1* | 10/2015 | Deponte | H01M 50/534 429/94 |
| 2015/0349299 | A1* | 12/2015 | Yamada | H01M 50/119 429/185 |
| 2015/0364732 | A1* | 12/2015 | Kim | H01M 50/103 429/179 |
| 2016/0294017 | A1* | 10/2016 | Ebisuzaki | H01M 10/0525 |
| 2020/0395579 | A1* | 12/2020 | Ichinohashi | H01G 11/22 |
| 2021/0020885 | A1* | 1/2021 | Ogawa | H01M 10/0431 |

FOREIGN PATENT DOCUMENTS

| | | |
|---|---|---|
| JP | 2011-192476 A | 9/2011 |
| JP | 2013-161755 A | 2/2012 |
| JP | 2013-179015 A | 9/2013 |
| JP | 2016-129144 A | 7/2016 |
| JP | 2018-081792 A | 5/2018 |

OTHER PUBLICATIONS

Machine Translation of DE-102014201078-A1 (Jun. 11, 2024) (Year: 2024).*
Chinese Search Report dated Jan. 22, 2024 issued in the corresponding Chinese Patent Application No. 202080046086.5, with English translation.
Extended European Search Report dated Nov. 15, 2022 issued in the corresponding European Patent Application No. 20843063.7.
International Search Report issued in International Patent Application No. PCT/JP2020/017977, dated Aug. 4, 2020, with English translation.

* cited by examiner

RECTANGULAR SECONDARY BATTERY

CROSS-REFERENCE OF RELATED APPLICATIONS

This application is the U.S. National Phase under 35 U.S.C. § 371 of International Patent Application No. PCT/JP2020/017977, filed on Apr. 27, 2020, which in turn claims the benefit of Japanese Application No. 2019-134853, filed on Jul. 22, 2019, the entire disclosures of which Applications are incorporated by reference herein.

TECHNICAL FIELD

The present invention relates to a rectangular secondary battery.

BACKGROUND ART

With a higher output of an on-vehicle secondary battery, a current flowing through the battery increases. As a result, an increasing amount of heat is generated in the battery, whereby the temperature of the entire battery rises. An excessive rise in the temperature of the entire battery may deteriorate resin parts such as a gasket and/or alter an electrolyte, for example.

Patent Document 1 discloses a secondary battery including a current collector connected to a power generation element (i.e., an electrode body). The current collector is in a shape branched into a plurality of parts to generate less heat.

CITATION LIST

Patent Document

Patent Document 1: Japanese Unexamined Patent Publication No. 2013-179015

SUMMARY OF THE INVENTION

The current collector with the structure disclosed in Patent Document 1 disperses a current to reduce the heat generated by concentration of the current. However, even if the current is dispersed, the amount of the generated heat itself is dispersed inside the battery, which inhibits the reduction in the temperature rise inside the battery. In particular, the temperature may rise excessively inside a battery through which a large current flows.

The present invention was made in view of the foregoing. It is a main objective of the present invention to provide a secondary battery causing less temperature rise inside, even if an increasing amount of heat is generated inside.

A rectangular secondary battery according to the present invention includes: an electrode body including a positive electrode plate and a negative electrode plate; a rectangular battery case having an opening and housing the electrode body; a sealing plate sealing the opening; a current collector connected to an edge of the positive electrode plate or the negative electrode plate at a longitudinal end of the sealing plate; and an external terminal located outside the sealing plate and connected to the current collector, the electrode body and the current collector being wrapped in an insulating holder and housed in the battery case, the current collector being in contact with a bottom of the battery case with the insulating holder interposed therebetween.

The present invention provides a secondary battery causing less temperature rise inside, even if an increasing amount of heat is generated inside.

BRIEF DESCRIPTION OF THE DRAWINGS

FIG. 1A is a top view, while FIG. 1B is a cross-sectional view taken along line Ib-Ib of FIG. 1A.

DESCRIPTION OF EMBODIMENT

An embodiment of the present invention will be described in detail with reference to the drawings. Note that the present invention is not limited to the following embodiment. Modifications may be made as appropriate without departing from the scope of the advantages of the present invention.

Figure 1A:
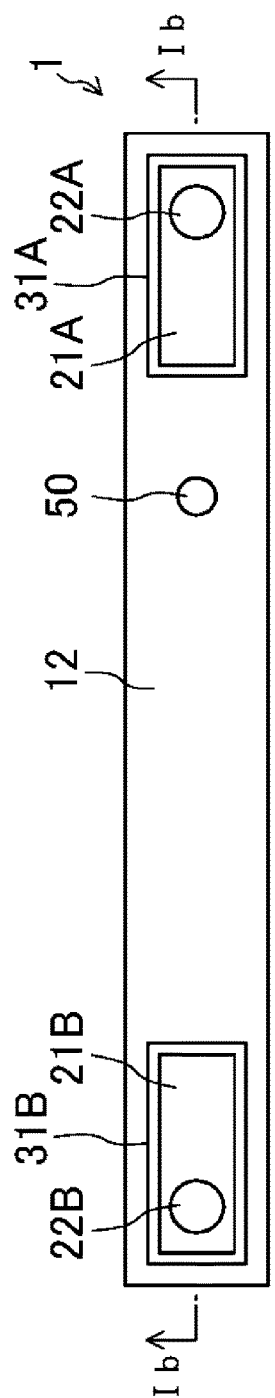
FIG. 1A and FIG. 1B schematically show a configuration of a rectangular secondary battery according to an embodiment of the present invention.
Figure 1B:
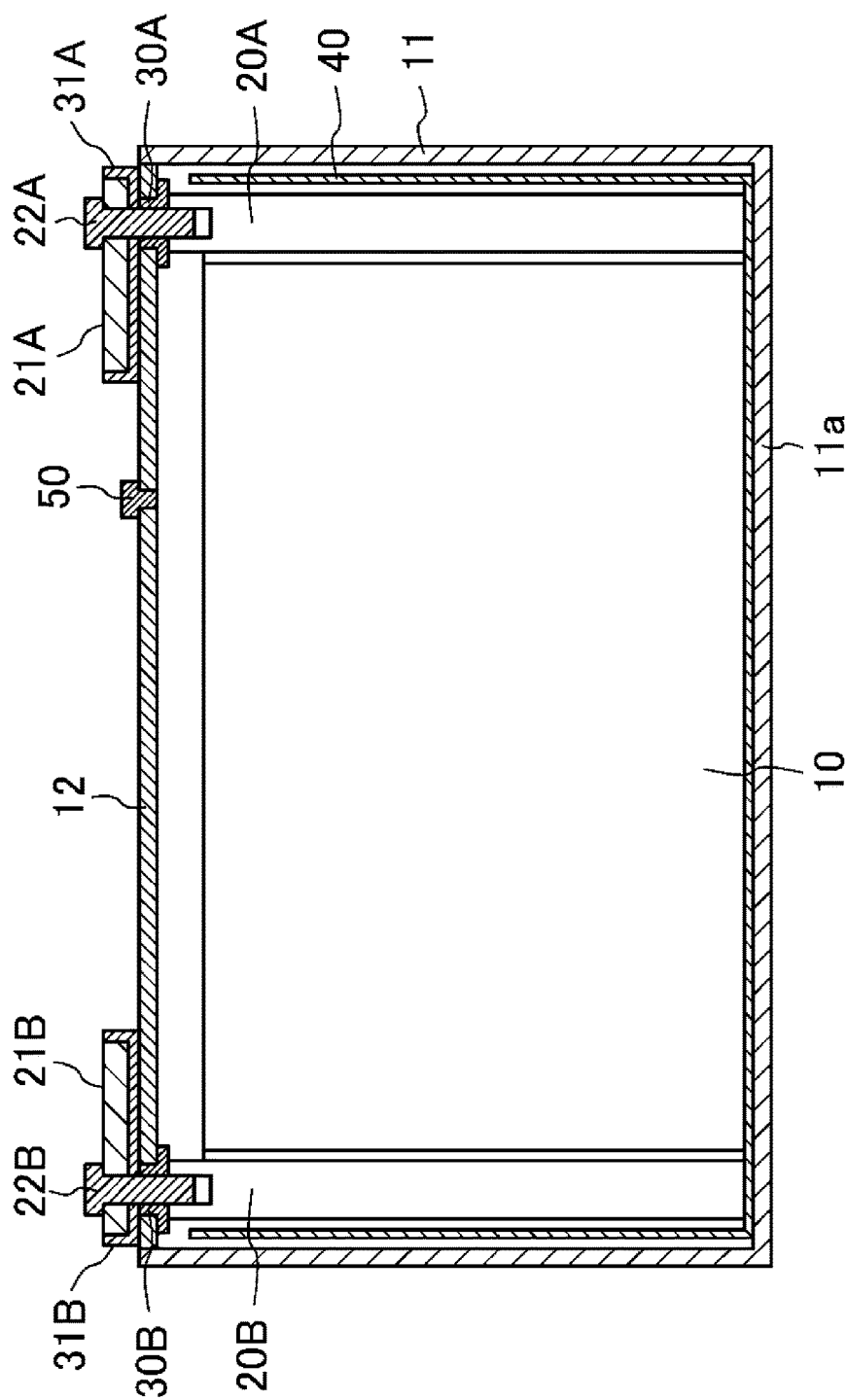

FIG. 1A and FIG. 1B schematically show a configuration of a rectangular secondary battery according to an embodiment of the present invention. FIG. 1A is a top view, while FIG. 1B is a cross-sectional view taken along line Ib-Ib of FIG. 1A.

As shown in FIG. 1A and FIG. 1B, in a rectangular secondary battery 1 according to this embodiment, an electrode body 10, which is a power generation element, is housed together with an electrolyte in a rectangular battery case 11. The structure of the electrode body 10 is obtained by stacking a positive electrode plate and a negative electrode plate with a separator (none of them are shown) interposed therebetween. The positive electrode plate includes a positive electrode active material layer on the surface of a positive electrode core, while the negative electrode plate includes a negative electrode active material layer on the surface of a negative electrode core. The battery case 11 has an opening sealed with a sealing plate 12.

Each of the positive and negative electrode plates has exposures 10a and 10b, in which the active material layer is not formed, at the longitudinal ends of the sealing plate 12. The exposures 10a and 10b extend oppositely along the longitudinal direction of the sealing plate 12 and are connected to positive and negative current collectors 20A and 20B, respectively. Specifically, the plurality of exposures 10a and 10b are jointed to the current collectors 20A and 20B, respectively, while being bundled. The joining may be ultrasonic joining, for example.

The materials of the current collectors 20A and 10B are not particularly limited, but are the same as the materials of the exposures 10a and 10b of the positive and negative electrode plates, respectively, in one preferred embodiment. This facilitates the ultrasonic welding of the exposures 10a and 10b and the current collectors 20A and 20B. For example, in the case of a lithium ion secondary battery, the current collector 20A connected to the exposure 10a of the positive electrode plate is made of aluminum or an aluminum alloy. The current collector 20B connected to the exposure 10b of the negative electrode plate is made of copper or a copper alloy in one preferred embodiment.

The current collectors 20A and 20B of the positive electrode are respectively connected to positive and negative external terminals 21A and 21B outside the sealing plate 12 with connectors 22A and 22B interposed therebetween. Here, the connectors 22A and 22B pass through through-holes in the sealing plate 12 and are connected to the external terminals 21A and 21B, respectively. The connectors 22A and 22B are insulated from the sealing plate 12 by insulating members 30A and 30B, respectively. The external terminals 21A and 21B are insulated from the sealing plate 12 by insulating members 31A and 31B, respectively.

The electrode body 10 and the current collectors 20A and 20B are wrapped in an insulating holder 40 and housed in the battery case 11. The insulating holder 40 is in the shape of a bag open toward the sealing plate 12. The material of the insulating holder 40 is not particularly limited, and examples thereof include resin sheets such as polypropylene (PP) and polyethylene (PET).

The current collectors 20A and 20B are in contact with the bottom 11a of the battery case 11 with the insulating holder 40 interposed therebetween. In one preferred embodiment, the current collectors 20A and 20B press the insulating holder 40 and are in contact with the bottom 11a of the battery case 11. That is, the insulating holder 40 is compressed along the thickness at portions between the current collectors 20A and 20B and the bottom 11a of the battery case 11 in one preferred embodiment.

Figure 2:
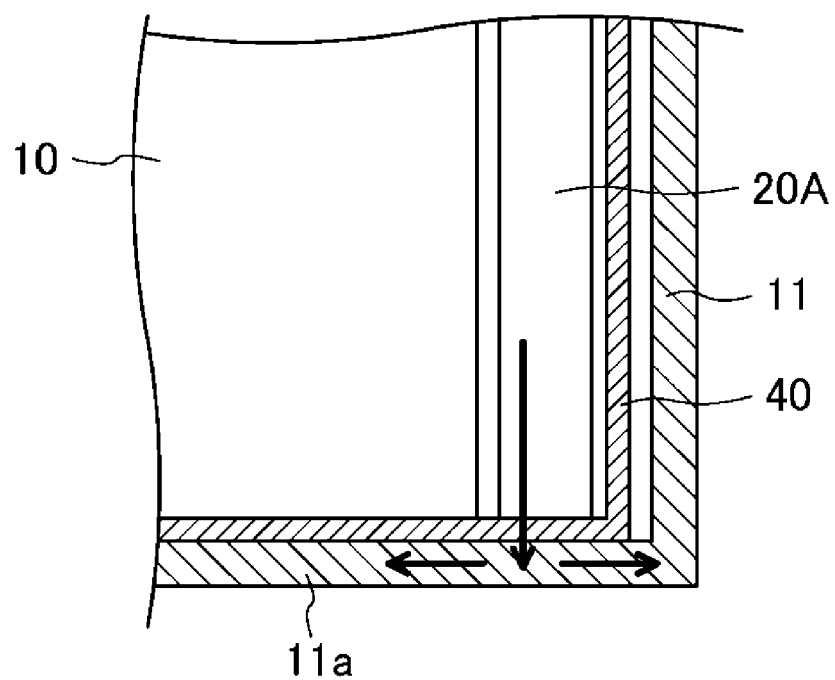
FIG. 2 is an enlarged partial cross-sectional view of portion around the bottom of a battery case of a current collector shown in FIG. 1B.
Figure 3:
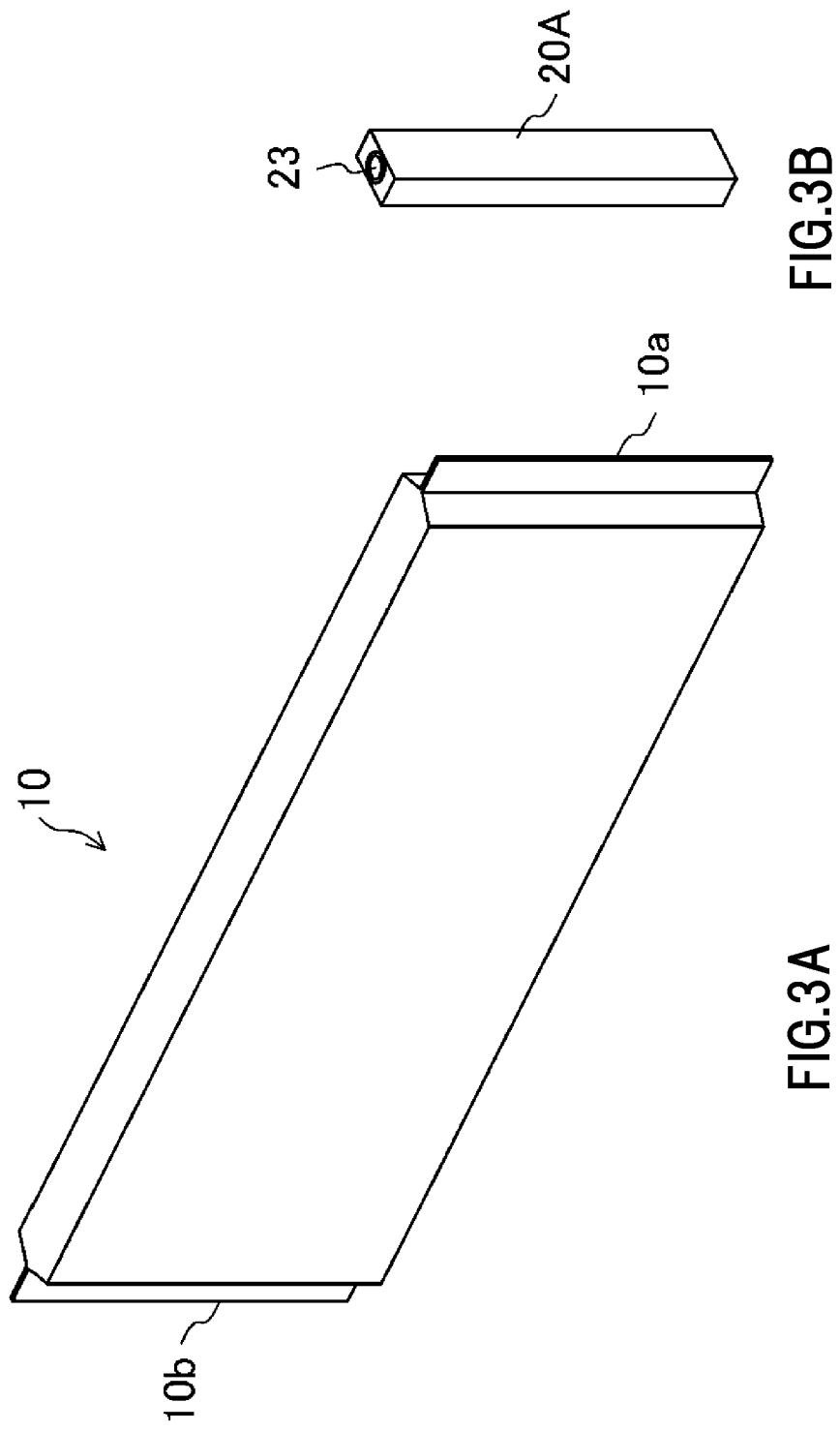
FIG. 3A and FIG. 3B illustrate a procedure of assembling the battery according to the embodiment.

FIG. 2 is an enlarged partial cross-sectional view of portion around the bottom 11a of the battery case 11 of the current collector 20A shown in FIG. 1B.

As shown in FIG. 2, the heat generated by the current collected by the current collector 20A is dissipated to the bottom 11a of the battery case 11 via the insulating holder 40 as indicated by arrows. The battery case 11 is made of a metal with a high thermal conductivity. The heat transmitted to the bottom 11a of the battery case 11 is thus quickly transmitted to the entire battery case 11 and dissipated to the outside of the battery 1. Accordingly, the heat generated inside the battery 1 can be quickly dissipated to the outside of the battery 1.

In this embodiment, the current collector 20A is a block body with a thickness along the width of the sealing plate 12 in one preferred embodiment. Accordingly, the thermal conductivity of the current collector 20A improves, which allows more quick dissipation of the heat generated inside the battery 1 to the outside of the battery 1.

The on-vehicle rectangular secondary battery is operated after being assembled with a module and a pack. The pack has an air or water cooling mechanism to reduce thermal runaway. In this embodiment, this mechanism efficiently dissipates the heat to the outside of the battery. As an advantage of this embodiment, a simple cooling mechanism is expected by the efficient cooling.

The insulating holder 40 has a thickness within a range from 0.05 mm to 0.5 mm, for example, in one preferred embodiment. The insulating holder 40 with a thickness smaller than 0.05 mm may be damaged when being pressed by the current collector 20A. As a result, the insulation properties between the current collector 20A and the battery case 11 may deteriorate. On the other hand, the insulating holder 40 with a thickness greater than 0.5 mm may deteriorate the thermal conductivity from the current collector 20A to the bottom 11a of the battery case 11.

Now, a procedure of assembling the battery 1 according to this embodiment will be described with reference to FIGS. 3 to 6.

First, as shown in FIG. 3A and FIG. 3B, the electrode body 10 and the current collector 20A (or 20B) are prepared. As shown in FIG. 3A, the electrode body 10 has positive and negative exposures 10a and 10b at both the longitudinal ends of the sealing plate 12. As shown in FIG. 3B, the current collector 20A is a block body and has a hole 23, into which the connector 22A (or 22B) is inserted, at the end closer the sealing plate 12.

Figure 4:
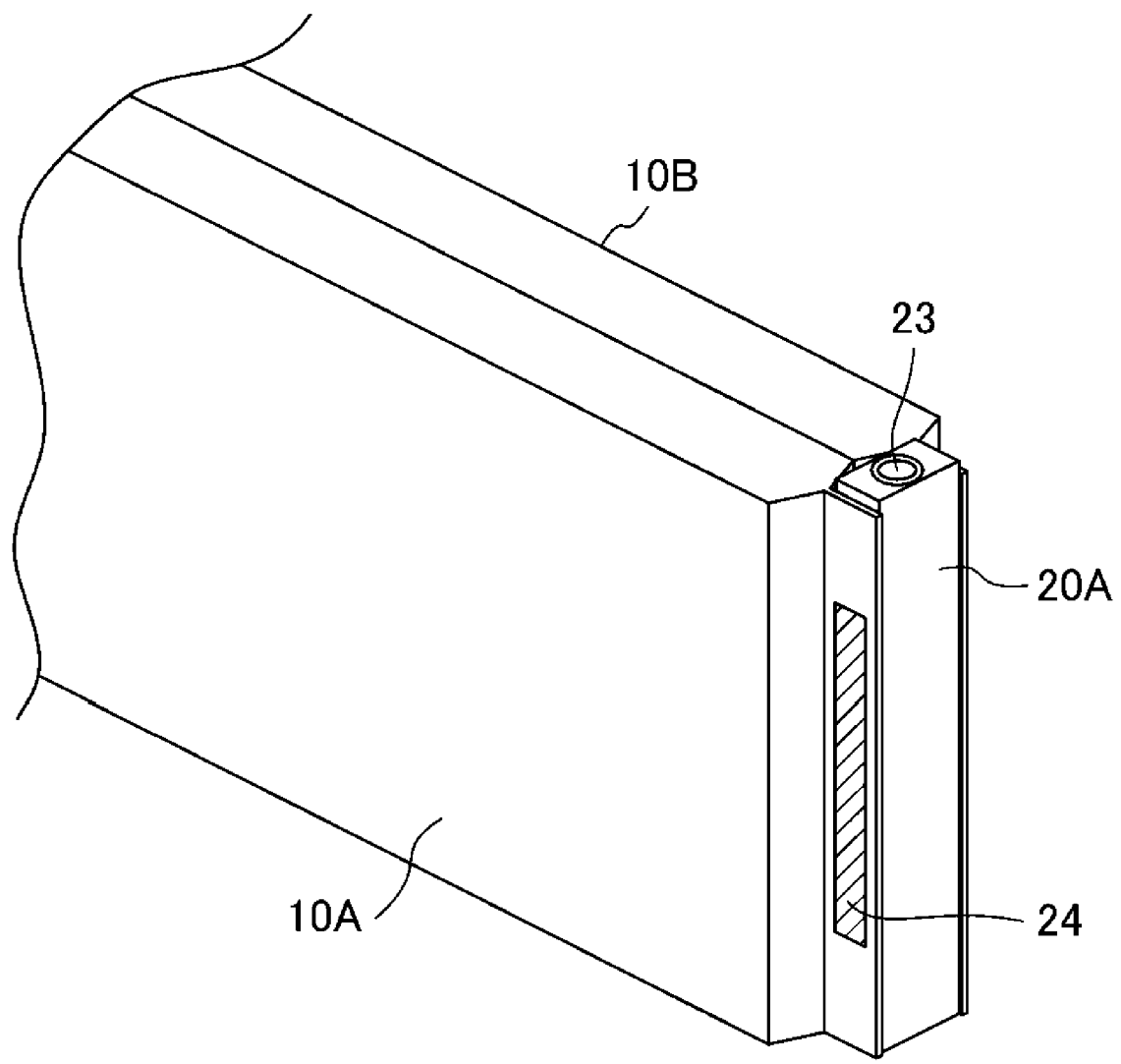
FIG. 4 illustrates the procedure of assembling the battery according to the embodiment.

Next, as shown in FIG. 4, the two electrode bodies 10A and 10B with the same structure are arranged side by side along the width of the sealing plate 12. The exposures 10a and 10a of the electrode bodies 10A and 10B sandwich the current collector 20A. The exposures 10a and 10a and the current collector 20A are joined by ultrasonic welding, for example, in a joint area 24.

Figure 5A:
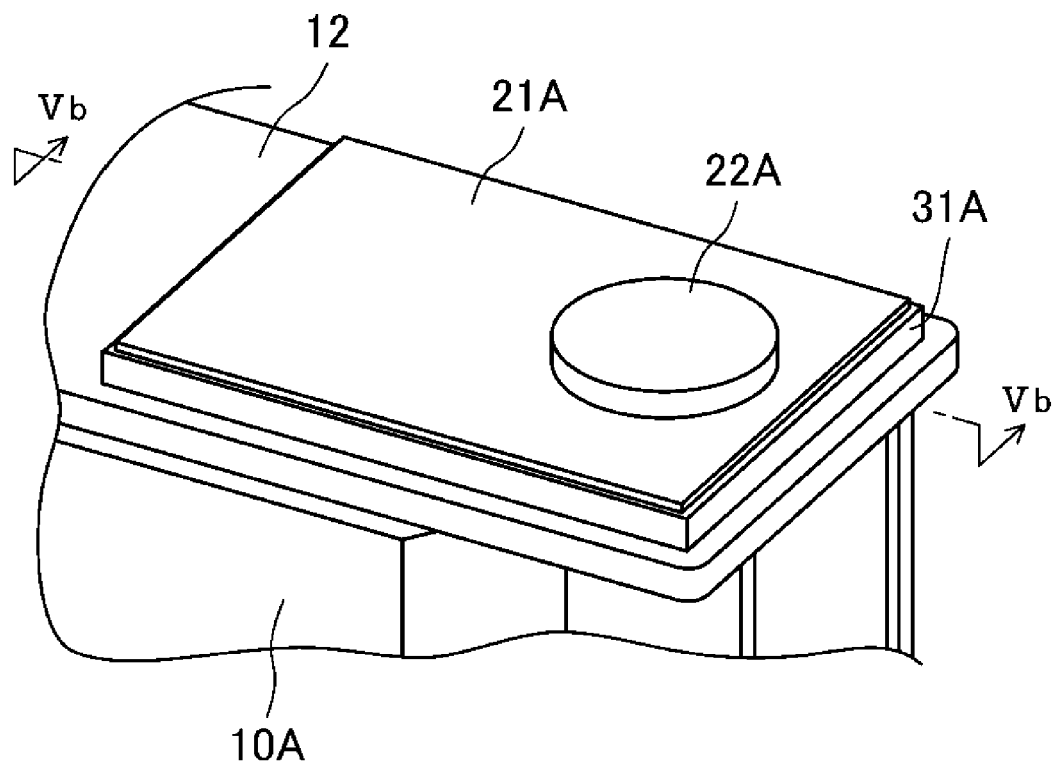
FIG. 5A and FIG. 5B illustrate the procedure of assembling the battery according to the embodiment.
Figure 5B:
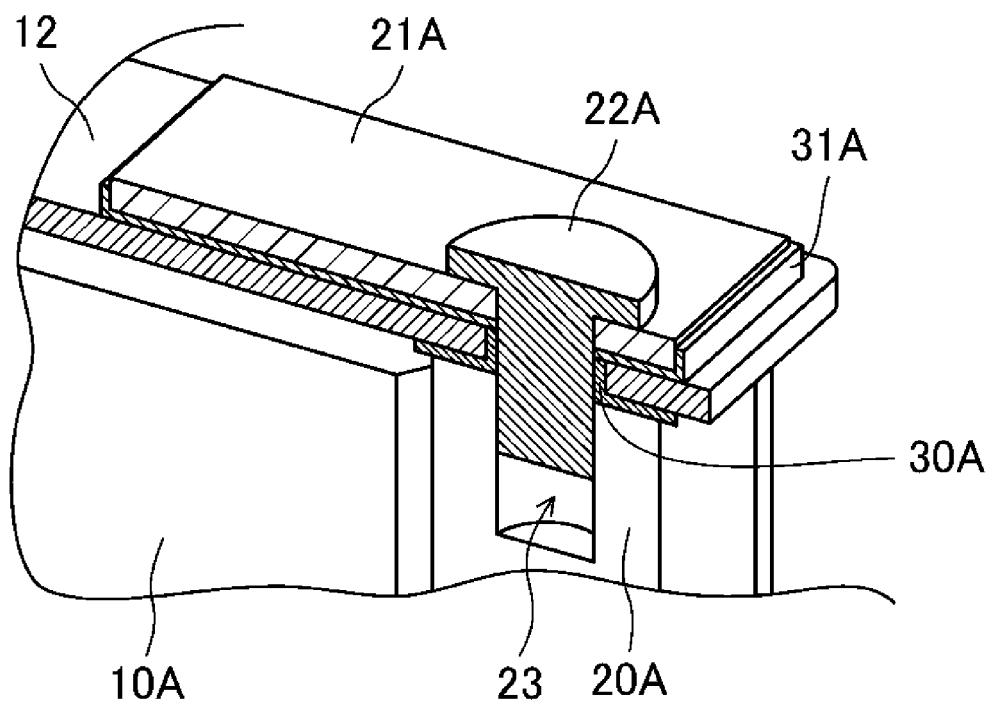

Next, as shown in FIG. 5A and FIG. 5B, the current collector 20A is fixed to the sealing plate 12 and the external terminal 21A. Here, FIG. 5A is an enlarged partial perspective view of portion around the sealing plate 12 of the current collector 20A. FIG. 5B is a partial cross-sectional view taken along line Vb-Vb of FIG. 5A.

As shown in FIG. 5A and FIG. 5B, the insulating member 30A, the sealing plate 12, the insulating member 31A, and the external terminal 21A are placed in this order on the current collector 20A. Each of the insulating member 30A, the sealing plate 12, the insulating member 31A, and the external terminal 21A has a through-hole in a corresponding position to the hole 23 of the current collector 20A. In addition, the insulating member 30A has an outer periphery abutting on the inner peripheral surface of the through-hole in the sealing plate 12. Then, the connector 22A in the shape of a bolt passes through the through-holes in the insulating member 30A, the sealing plate 12, the insulating member 31A, and the external terminal 21A, and fastened to the screw hole 23 of the current collector 20A. Instead of fastening with the bolt, an end of the connector 22A may be crimped to the external terminal 21A to fix the current collector 20A and the external terminal 21A to the sealing plate 12.

Figure 6:
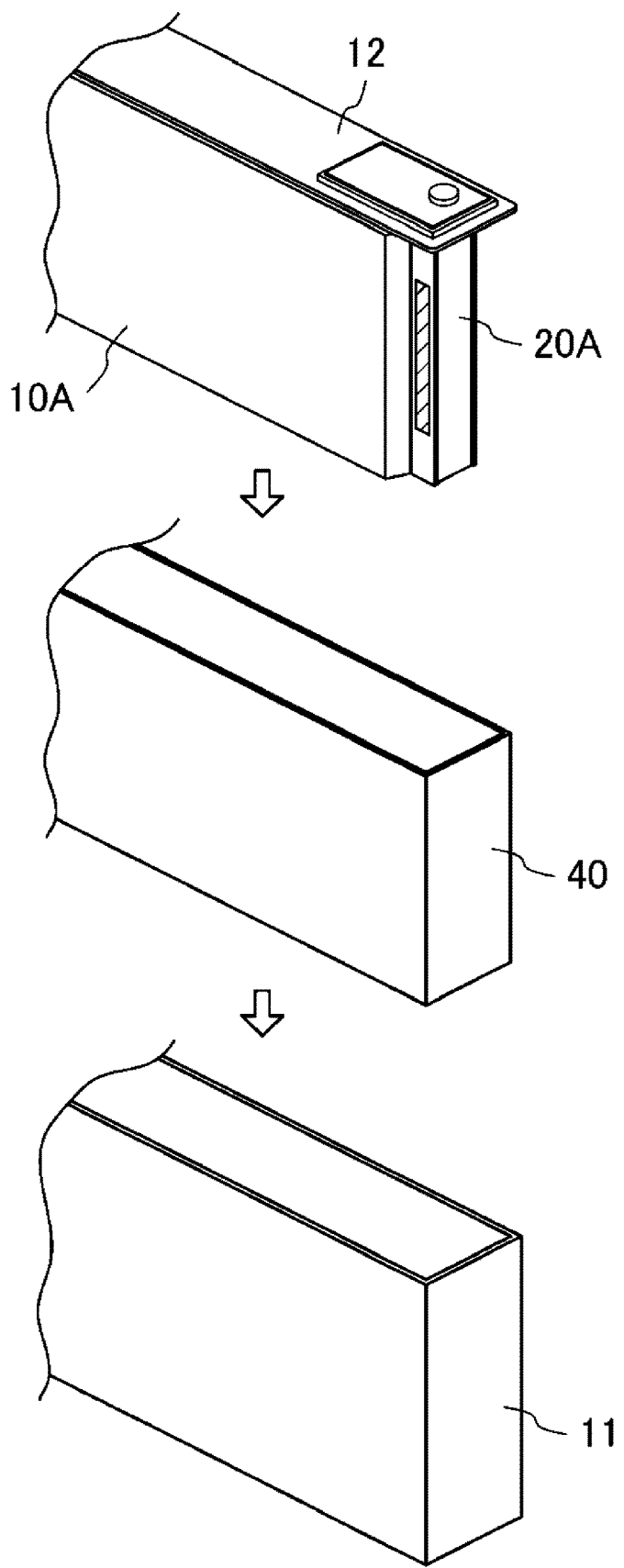
FIG. 6 illustrates the procedure of assembling the battery according to the embodiment.

Next, as shown in FIG. 6, the sealing plate 12, to which the current collector 20A or other element are integrally fixed, is inserted into the insulating holder 40. The electrode body 10 and the current collector 20A wrapped in the insulating holder 40 are then housed in the battery case 11. Here, in the direction perpendicular to the sealing plate 12, the current collector 20A may have a length determined in advance in accordance with the height of the battery case 11. Accordingly, the current collector 20A comes into contact with the bottom 11a of the battery case 11 with the insulating holder 40 interposed therebetween. In addition, the thickness of the insulating holder 40 and the tolerance of the longitudinal size of the current collector 20A are taken into consideration. Accordingly, the current collector 20A comes into contact with the bottom 11a of the battery case 11 with the insulating holder 40 compressed along its thickness.

After that, the end of the battery case 11 closer to the opening and the outer periphery of the sealing plate 12 are welded with laser, for example, to seal the battery case 11. At the end, an electrolyte is poured into the battery case 11 through a liquid inlet 12a in the sealing plate 12, and then the liquid inlet 12a is closed with a plug 50 (see FIG. 1).

Figure 7:
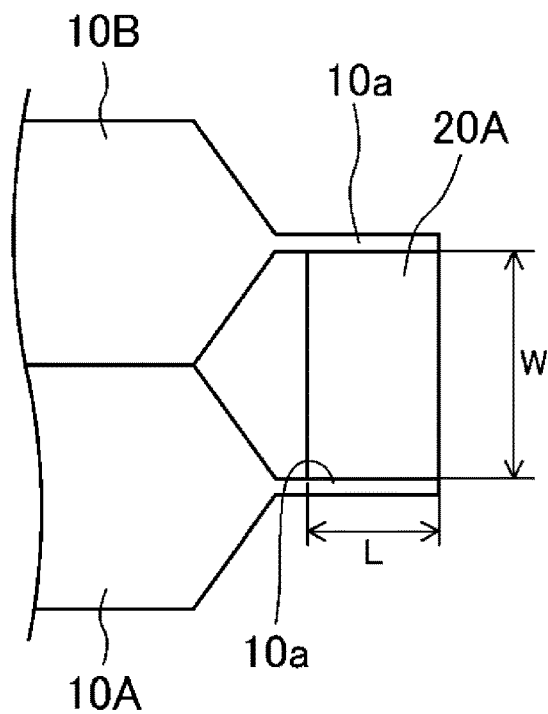
FIG. 7 is an enlarged partial cross-sectional view of portion around a joint between exposures and a current collector shown in FIG. 4, taken along a plane parallel to a sealing plate.

FIG. 7 is an enlarged partial cross-sectional view of portion around the joint between exposures 10a and the current collector 20A shown in FIG. 4, taken along a plane parallel to the sealing plate 12.

As described above, the current collector 20A is sandwiched between the exposures 10a and 10a of the two electrode bodies 10A and 10B to join the exposures 10a and the current collector 20A. That is, the current collector 20A is a block body with a width W along the width of the sealing plate 12. Accordingly, the thermal conductivity of the current collector 20A improves, which allows more quick transmission of the heat generated inside the battery 1 to the bottom 11a of the battery case 11.

Here, W:L falls within a range from 4:1 to 1:1 in one preferred embodiment, where L is the length of the contact surface between the current collector 20A and the exposures 10a and 10a. In addition, the current collector 20A has a solid structure in one preferred embodiment, but may have a hollow structure in portion thereof.

Figure 8:
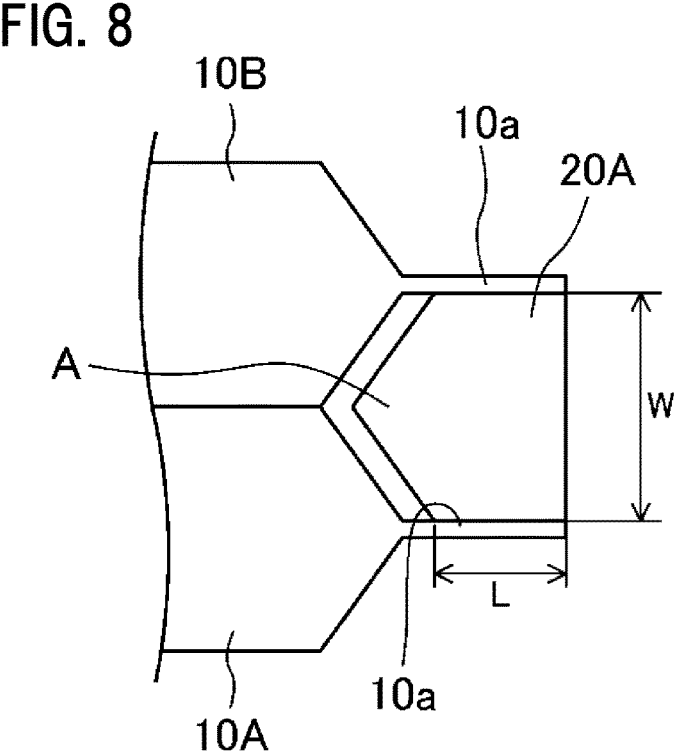
FIG. 8 is a partial cross-sectional view of another configuration of the current collector.

The current collector 20A is not necessarily a substantially rectangular parallelepiped shape. For example, as shown in FIG. 8, one side surface of the current collector 20A may have a protrusion A toward the electrode body 10A or 10B. This increases the cross-sectional area of the current collector 20A on a plane parallel to the sealing plate 12, thereby further improving the thermal conductivity of the current collector 20A.

In the rectangular secondary battery according to this embodiment, the electrode body 10 and the current collector 20 are wrapped in the insulating holder 40 and housed in the battery case 11. The current collector 20 is in contact with the bottom 11a of the battery case 11 with the insulating holder 40 interposed therebetween. This allows quick transmission of the heat generated inside the battery 1 to the bottom 11a of the battery case 11 via the current collector 20 and the insulating holder 40. Accordingly, the heat generated inside the battery can be quickly dissipated to the outside of the battery. This results in less temperature rise inside the battery, even if an increasing amount of heat is generated inside the battery.

While the present invention has been described with reference to a preferred embodiment, such description is not limiting, and various modifications may be made.

In the embodiment described above, each electrode body is obtained by stacking the positive and negative electrode plates with the separator interposed therebetween. Alternatively, the positive and negative electrode plates may be wound with a separator interposed therebetween.

Figure 9:
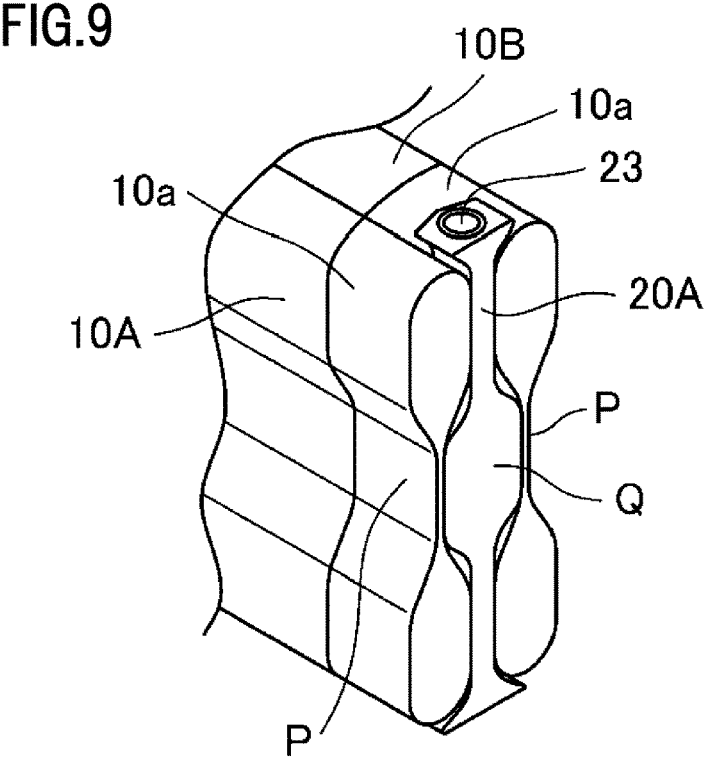
FIG. 9 is a partial schematic perspective view of a structure of the current collector for electrode bodies with a wound structure.

FIG. 9 is a partial perspective view schematically showing a structure of the current collector 20A for the electrode body 10A with the wound structure.

As shown in FIG. 9, the electrode bodies 10A and 10B have a plurality of exposures 10a at the longitudinal ends of the sealing plate 12 of wound electrode plates. Each of the exposures 10a is compressed at a middle area P in the height direction of the battery case 11, while being bundled.

On the other hand, the current collector 20A is placed while being sandwiched between the exposures 10a and 10a of the electrode bodies 10A and 10B. At this time, in a middle area Q in the height direction of the battery case 11, the current collector 20A has, along the width of the sealing plate 12, a width increasing toward the exposures 10a and 10a to come into contact with the exposures 10a and 10a. Accordingly, in the areas P and Q, the current collector 20A and the exposures 10a and 10a are joined by ultrasonic welding, for example.

Figure 10:
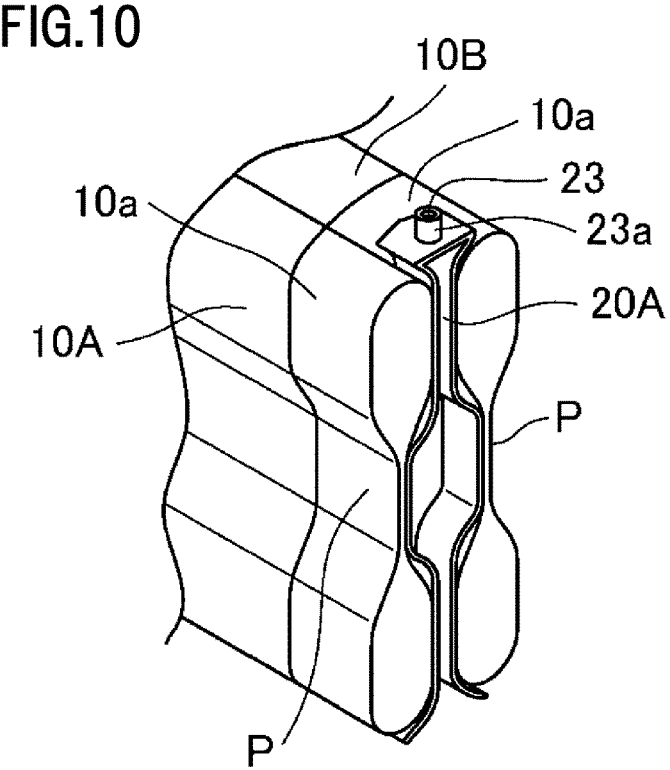
FIG. 10 is a partial schematic perspective view of another structure of the current collector for electrode bodies with a wound structure.
Figure 11:
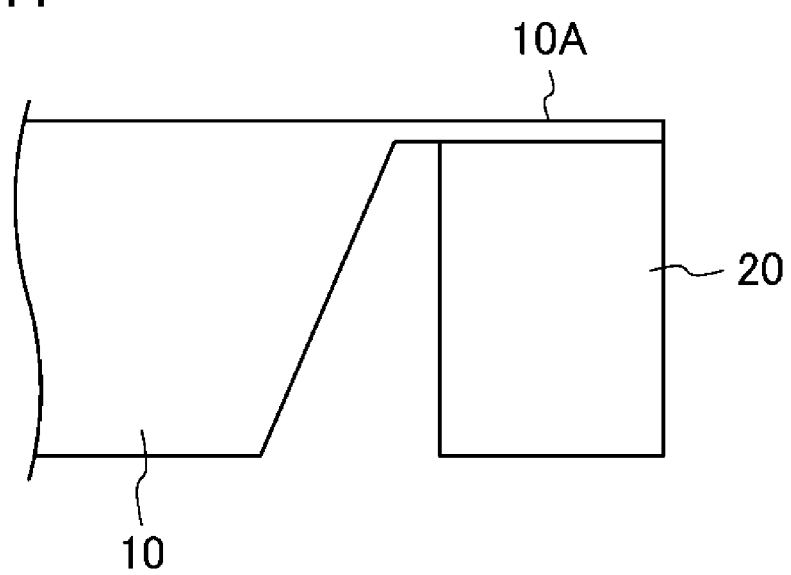
FIG. 11 is a partial cross-sectional view of a structure of the current collector for a single electrode body.

The current collector 20A has a solid structure in FIG. 9, but may have a hollow structure as shown in FIG. 10. In this case, the hole 23, into which the connector 22A (22B) is inserted, may be made as follows. The current collector 20A may have, at the end closer to the sealing plate 12, a cylindrical part 23a with the hole 23. An alternative method may be the crimping described above.

In the embodiment described above, the two electrode bodies 10A and 10B with the same structure are arranged in the battery case 11. Alternatively, a single electrode body may be placed. In this case, as shown in FIG. 10, the electrode body 10 has, at the longitudinal ends of the sealing plate 12, a plurality of exposures 10a which are bundled at the transverse ends of the sealing plate 12. Then, the exposures 10a and the current collector 20 may be joined by ultrasonic welding, for example, with the current collector 20 abutting on the exposures 10a.

In the embodiment described above, the current collectors 20A and 20B are connected to the exposures 10a and 10b at both edges of the positive and negative electrode plates, respectively. Alternatively, the current collector 20 may be connected to the exposures 10a and 10b of only one of the positive or negative electrode plate.

An example has been described above in the embodiment where the exposures 10a and 10b and the current collectors 20A and 20B are joined by ultrasonic welding. The present invention is not limited thereto. For example, resistance welding or laser welding may be employed.

A structure has been described above in the embodiment where the current collectors 20A and 20B are respectively connected to the external terminals 21A and 21B with the connectors 22A and 22B interposed therebetween. The present invention is not limited thereto. Any structure may be employed as long as the current collectors 20A and 20B are electrically connected to the external terminals 21A and 21B, respectively.

The type of the rectangular secondary battery according to this embodiment is not particularly limited. For example, the rectangular secondary battery is applicable to a lithium ion secondary battery, a nickel hydrogen secondary battery, or other batteries.

DESCRIPTION OF REFERENCE CHARACTERS

1 Rectangular Secondary Battery
10 (10A, 10B) Electrode Body
10a, 10b Exposure
11 Battery Case
11a Bottom
11b Flow Path
12 Sealing Plate
12a Liquid Inlet
20 (20A, 20B) Current Collector
21A, 21B External Terminal
22A, 22B Connector
23 Hole
23a Cylindrical Part 24 Joint Area
30A, 30B Insulating Member
31A, 31B Insulating Member
40 Insulating Holder
50 Plug

The invention claimed is:

1. A rectangular secondary battery comprising:
an electrode body including a positive electrode plate and a negative electrode plate;
a rectangular battery case having an opening and housing the electrode body;
a sealing plate sealing the opening;
a current collector connected to an edge of the positive electrode plate or the negative electrode plate at a longitudinal end of the sealing plate; and
an external terminal located outside the sealing plate and connected to the current collector, wherein:
the current collector extends, at the longitudinal end of the sealing plate, in a direction perpendicular to the sealing plate from the sealing plate toward a bottom of the battery case,
the electrode body and the current collector are wrapped in an insulating holder and housed in the battery case, while being integrally fixed to the sealing plate,
the insulating holder is in a shape of a bag open toward the sealing plate, and
the insulating holder is compressed along a thickness thereof at a portion between the current collector and the bottom of the battery case.

2. The rectangular secondary battery of claim 1, wherein the current collector is a block body with a thickness along a width of the sealing plate.

3. The rectangular secondary battery of claim 1, wherein the insulating holder is formed of a resin sheet.

4. The rectangular secondary battery of claim 1, wherein the electrode body includes a plurality of electrode bodies, and
an edge of the positive electrode plate or the negative electrode plate of each of the electrode bodies is connected to the current collector.

5. The rectangular secondary battery of claim 2, wherein the insulating holder is formed of a resin sheet.

6. The rectangular secondary battery of claim 2, wherein the electrode body includes a plurality of electrode bodies, and
an edge of the positive electrode plate or the negative electrode plate of each of the electrode bodies is connected to the current collector.

7. The rectangular secondary battery of claim 3, wherein the electrode body includes a plurality of electrode bodies, and
an edge of the positive electrode plate or the negative electrode plate of each of the electrode bodies is connected to the current collector.

8. The rectangular secondary battery of claim 1, wherein a portion of the insulating holder is disposed between the battery case and the current collector, the portion of the insulating holder disposed between the battery case and the current collector is perpendicular to the bottom of the battery case, the current collector as a whole is disposed between the electrode body and the portion of the insulating holder disposed between the battery case and the current collector.

* * * * *